United States Patent [19]
Litvinovich et al.

[11] 3,830,109
[45] Aug. 20, 1974

[54] DEVICE FOR DYNAMIC BALANCING OF ROTORS

[76] Inventors: Georgy Mikhailovich Litvinovich, ulitsa Gorkogo, 43, kv. 50, Moscow; Leonid Andreevich Zhavoronkov, ulitsa Serova, 14, kv. 33, Zhukovsky Moskovskoi oblasti; Nikolai Alexandrovich Stebelev, ulitsa Pilota Nesterova, 9, kv. 29; Konstantin Borisovich Guzov, ulitsa Arbat, 2, kv. 6, both of Moscow; Ivan Nikitovich Tyagaev, ulitsa Mikhalevicha, 1, kv. 51, Ramenskoe Moskovskoi oblasti, all of U.S.S.R.

[22] Filed: July 10, 1972

[21] Appl. No.: 270,566

[52] U.S. Cl. ..................................... 73/455, 73/458
[51] Int. Cl. ..................... G01m 1/20, G01m 1/28
[58] Field of Search ............. 73/455, 458, 468, 469, 73/470, 66

[56] References Cited
UNITED STATES PATENTS

| | | | |
|---|---|---|---|
| 1,876,527 | 9/1932 | Thearle et al. | 73/470 |
| 2,336,429 | 12/1943 | Wenger | 73/469 |
| 2,675,200 | 4/1954 | Wohlforth | 73/470 X |

FOREIGN PATENTS OR APPLICATIONS

| | | | |
|---|---|---|---|
| 246,900 | 5/1970 | U.S.S.R. | 73/470 |

*Primary Examiner*—James J. Gill
*Attorney, Agent, or Firm*—Eric H. Waters

[57] ABSTRACT

A device for dynamic balancing of rotors comprising a body in the form of a ring secured on the side surface of the rotor being balanced and a disc with a test weight installed on said body and rotated relative to the body by means of an independent drive.

6 Claims, 1 Drawing Figure

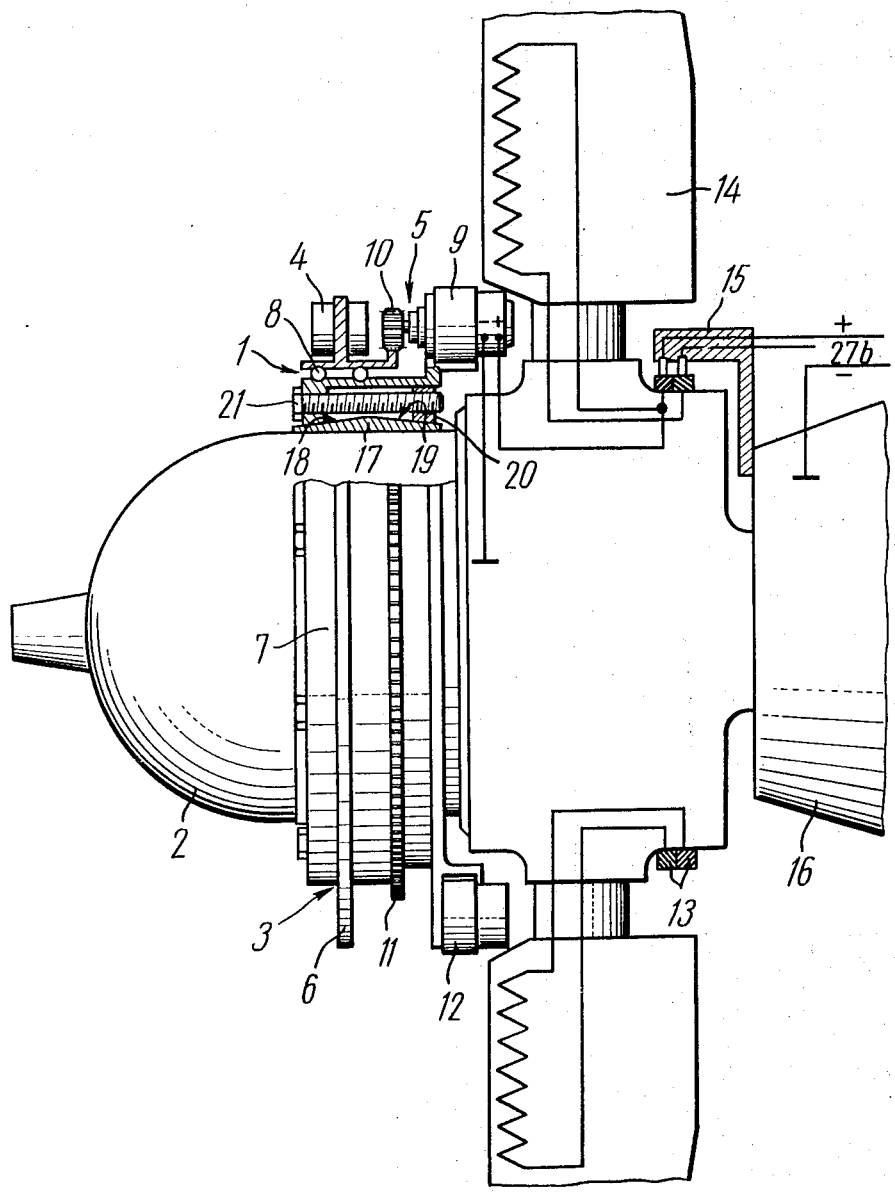

DEVICE FOR DYNAMIC BALANCING OF ROTORS

The present invention relates to balancing devices and more specifically it relates to the devices for dynamic balancing of rotors of machines and mechanisms during their operation.

Most successfully, this invention can be utilized in aircraft engineering for dynamic balancing of aircraft propellers.

In a number of instances the aircraft structures are subjected to violent vibrations caused by unbalanced propellers. These vibrations lead to additional dynamic loads and vibration stresses in the load-carrying units of aircraft structures and produce unpleasant physiological effect on the members of the crew and passengers.

The aircraft propeller may have a mass unbalance and an aerodynamic unbalance.

The unbalance of the mass origin can be reduced to a considerable extent by static balancing of propellers on balancing stands which have found wide application in industry.

However, after the installation of a statically balanced propeller on an aircraft the mass unbalance may grow due to radial displacement of the propeller from its rotation axis and to taking up of the radial clearances in the bearings of the engine reduction gear shaft.

In flight, the mass unbalance is aggravated by a dynamic unbalance caused by the effect of centrifugal forces and by an aerodynamic unbalance caused by the different aerodynamic characteristics of the propeller blades.

The dynamic balancing of rotors of various machines and mechanisms has become widely popular throughout the world. It is carried out on balancing stands where the rotor is balanced separately prior to installation in its housing.

Being actuated by relatively low-power drives, such stands cannot spin up the aircraft propeller to the operational speeds actually attained in flight.

Also known in the art are devices for the dynamic balancing of aircraft propellers in flight.

These devices comprise two main coaxial parts; one of these, the body of the device, is secured by means of a rigid bracket on the face of the propeller hub and rotates together with it while the second part, a disc carrying a test weight, is free-mounted on an axle and is rotated for moving the test weight peripherally to the "light" point of the propeller being balanced.

The disc with the test weight is rotated in the known device by means of a speed reducer with a large set of gear drives, installed in a housing. This speed reducer transmits torque to the disc in the form of pulses which arise when the propeller is accelerated by the pilot who changes momentarily the speed of the aircraft engine.

Simultaneously, the engine vibration amplitude is registered and, at the moment when it drops to a minimum, the point of installation and the size of the balancing weight are determined by means of a stroboscope (on two circular indicating panels installed on the propeller hub) after which the balancing weight is fastened on the propeller.

Among the disadvantages of such devices are a comparative intricacy of their design, particularly of their speed reducer, and the fastening of the device on the face of the propeller hub with a very stiff bracket which affects adversely the standard of balancing.

It should also be borne in mind that such devices cannot be used for dynamic balancing of variable-pitch propellers because they rotate at a constant speed, regardless of the engine operating conditions, and cannot be accelerated.

Besides, the provision of the stroboscope renders the known devices unfit for use in multiple-engine aircraft where the propeller axes do not lie in the plane of the pilot's cabin.

An object of the present invention resides in providing a device for dynamic balancing of rotors, particularly any types of aircraft propellers, under operating conditions, which would ensure a high quality of dynamic balancing though being comparatively simple in design and cheap in manufacture.

Another object of the invention is to simplify the dynamic balancing and cut down the time required for this process.

This and other objects are achieved by providing a device for dynamic balancing of rotors which comprises a body rotating together with the rotor, and a coaxial disc with a test weight installed with a provision for peripheral movement around the rotating rotor, wherein according to the invention the body of the device is made in the form of a ring secured to the side surface of the rotor while the disc with the test weight is free-mounted on said ring and is rotated relative to it by an independent drive.

Such a solution simplifies the design of the device and allows it to be installed in any point over the length of the rotor being balanced which makes it possible to bring the rotation plane of the test weight as near as possible to the plane of installation of the balancing weight and thus to raise the quality of dynamic balancing.

In one of the embodiments of the invention the independent drive has an electric motor secured on the body of the device and provided with a step-down gearbox whose output shaft carries a drive pinion meshing with a gear rim on the disc; the mass of the electric motor with the gearbox is statically balanced by a counterweight fastened to the body.

Such an arrangement makes it possible to move the test weight slowly and gradually around the periphery irrespective of the rotor speed which eventually improves the accuracy of balancing.

It is practicable that the electric motor should be powered by a D.C. supply through a single-wire earth-return system in which the "plus" of the current source would be delivered through the current collector slip ring mounted on the rotor while the "minus" would be fed through the rotor "ground."

Such an arrangement leads to a reduction in the size of the current collector thereby diminishing the weight of the device as a whole.

It is also practicable that the body should be secured to the side surface of the rotor by means of a split replaceable bushing provided on the outside with two tapered surfaces directed to each other by their larger bases and interacting, respectively, with a corresponding inner tapered surface on the body and with an inner tapered surface on the ring which latter can be shifted by means of clamping screws in a circular groove of the body.

Thus the body of the device is self-centered on the rotor being balanced.

Besides, the provision of a replaceable bushing adds to the versatility of the device since it can be installed on aircraft propellers with different diameters of their hubs.

Given below is a detailed description of one of the possible embodiments of the invention with reference to the accompanying drawing which is a side view (partly cut away) of the device installed on the hub of an aircraft propeller for its dynamic balancing.

The device according to the invention comprises a body 1 in the form of a cylindrical ring which is slipped on the side surface of the hub 2 of the propeller being balanced, and fastened to it.

Free-mounted on the body 1 is a disc 3 with a test weight 4, rotated relative to the body 1 by an independent drive 5. The disc 3 has a vertical rib 6 and a cylindrical base 7 installed on the body 1 with the aid of two rows of balls 8 housed in the corresponding circular grooves in the body 1 and the base 7 of the disc 3. The rib 6 of the disc 3 has a hole for fastening the test weight 4.

The independent drive 5 of the disc 3 consists of a small size electric motor 9 with a step-down gearbox (not shown) secured on the body 1 of the device and enclosed in a common housing with it. The output shaft of this gearbox carries a drive pinion 10 meshing with a gear rim 11 on the outer surface of the base 7 of the disc 3.

The mass of the electric motor 9 with the gearbox is balanced by counterweight 12 secured on the body 1, opposite to the side where the motor 9 is installed.

The electric motor is powered by a D.C. supply remotely, through a single-wire system. The "plus" of the 27 V supply source is delivered through one ring 13 of the current collector used for heating the propeller blades 14. The rings 13 of the current collector are fastened to the propeller hub 2 while the brush holder 15 with the brushes, to the aircraft engine 16. The "minus" of the electric motor 9 is formed by the "ground" of the propeller, engine 16, and aircraft.

The body 1 of the device is fastened to the side surface of the propeller hub 2 by means of a split replaceable bushing 17 consisting of two half-rings. This bushing 17 is installed by its cylindrical part directly on the propeller hub 2; the outer surface of the bushing has two tapered surfaces 18 and 19 directed to each other by their larger bases.

The tapered surface 18 interacts with the corresponding tapered surface of the body 1. The body 1 has a circular groove accommodating a ring 20 with an inside tapered surface which interacts with the tapered surface 19 of the split bushing 17. Equispaced around the face of the body 1 are holes receiving clamping screws 21 whose ends are turned into the corresponding threaded holes in the ring 20.

As said screws 21 are turned into the ring 20, the body 1 and the ring 20 move towards each other over the tapered surfaces 18 and 19 of the half-rings of the split bushing 17, so that these half-rings are pressed against the propeller hub 2. This ensures self-centering fastening of the device body 1 on the propeller hub 2.

The operating principle of the device for dynamic balancing of aircraft propellers consists in the following.

The device is placed on the hub 2 of the propeller being balanced and shifted as near as possible to the rotation plane of the propeller baldes 14 (or, in a general case, to the plane which can be used for the installation of the balancing weight), the test weight 4 being in any position.

Then, by tightening the clamping screws 21 uniformly, the body 1 is self-centered and secured on the propeller hub 2. This type of fastening ensures coaxiality of the device with the propeller and does not, therefore, introduce any additional unbalance. It must be noted that the device proper is well balanced statically.

Then the propeller with the device secured to it is accelerated to the operating speed. The disc 3 with the test weight 4 remains fixed on the body 1 (owing to the provision of a step-down gearbox in the independent drive 5 of the disc 3) and rotates together with the propeller hub 2. Rotation of the test weight 4 causes vibration of the aircraft engine 16 at a constant amplitude which is registered by an oscillograph or a visual indicator. Then electric power is supplied to the electric motor 9 which starts rotating the disc 3 with the test weight 4 via the step-down gearbox, drive pinion 10 and gear rim 11.

Slow peripheral movment of the test weight 4 relative to the body 1 of the device (and, consequently, to the propeller hub 2) changes the summary vector of the unbalanced force (of the test weight 4 and initial unbalanced force of the propeller) which reduces the amplitude of engine vibration from a maximum to a minimum value within one revolution of the test weight 4 relative to the propeller hub 2.

When the amplitude is reduced to a minimum, the electric motor 9 is cut off, thus fixing the test weight 4 on the propeller. Then the propeller itself is stopped.

The point of installation of the balancing weight lies on the line formed by the intersection of a plane which can be used for the installation of this weight with the plane passing through the propeller axis and through the position of the test weight 4. The weight of the balancing weight is found from the known equality of moments.

The balancing weight is fastened by conventional fastening parts after which the device is removed from the propeller hub 2. This completes the process of dynamic balancing of the aircraft propeller.

The use of the device according to the invention for the dynamic balancing of propellers on aircraft improves considerably the accuracy of balancing, raises the labour efficiency and gives a substantial saving in the cost and time required for this work.

From the viewpoint of design the device is quite simple and the weight of its experimental model for the aircraft propellers of 3,000 – 5,000 hp capacity is not over 5 kg which ensures an instrumetnal error of not over 4 percent and guarantees a high accuracy in the dynamic balancing of aircraft propellers.

Besides, the use of a small-size high-power electric motor 9 in the independent drive 5 of the disc 3 ensures a higher reliability of the device under serious overloads.

To conclude, it should be noted that, apart from aviation (aircraft and helicopters), the device according to the invention can find wide application on the ground and water transport facilities provided with screw propellers or fans (e.g., aerosleighs, ships with aircraft propellers) and for balancing of ship's propellers, automobile wheels and rotors of various machines and mechanisms under operating conditions.

What we claim is:

1. A device for dynamic balancing of rotors comprising, in combination, ring-shaped means secured on the outer cylindrical surface of the rotor to be balanced and rotating together with said rotor during the balancing process; a disc with a test weight mounted on said ring-shaped means and peripherally movable relative to said ring-shaped means; and drive means for rotating said disc with said test weight relative to said ring-shaped means, said drive means comprising an electric motor with a step-down gearbox mounted on said ring-shaped means, a rim gear on said disc, the output shaft of said gearbox carrying a drive pinion meshing with said rim gear, and a counterweight secured to said ring-shaped means for statically balancing the mass of said motor with said gearbox; a split replaceable bushing having two tapered surfaces on the exterior for securing said ring-shaped means to the side surface of said rotor, said surfaces being directed to each other by their larger bases and interacting, respectively, with a corresponding tapered surface on said ring-shaped means and an inner tapered surface on said ring-shaped means, said ring-shaped means having a circular groove, and clamping screws for moving said ring-shaped means in that circular groove.

2. A device according to claim 1 wherein the plane of said test weight is located substantially in the plane of the portion of the rotor to be balanced.

3. A device as defined in claim 1 wherein said rotor comprises a propeller, the plane of said propeller being substantially in the plane of said test weight.

4. A device for dynamic balancing of rotors comprising, in combination, ring-shaped means secured to the side surface of the rotor to be blanaced and rotating together with said rotor during the balancing process; a disc with a test weight mounted on said ring-shaped means and peripherally movable relative to said ring-shaped means; drive means for rotating said disc with said test weight relative to said ring-shaped means, said drive means comprising an electric motor with a step-down gearbox mounted on said ring-shaped means, a rim gear on said disc, the output shaft of said gearbox carrying a drive pinion meshing with said rim gear, and a counterweight secured to said ring-shaped means for statically balancing the mass of said motor with said gearbox.

5. A device according to claim 4 including a D.C. power supply for said electric motor and supplying power through a single-wire system, the plus line being fed through a current collector ring secured to the rotor and the minus line being fed through the rotor ground potential.

6. A device for dynamic balancing of rotors comprising, in combination, ring-shaped means secured to the side surface of the rotor to be balanced and rotating together with said rotor during the balancing process; a disc with a test weight mounted on said ring-shaped means and peripherally movable relative to said ring-shaped means; drive means for rotating said disc with said test weight relative to said ring-shaped means; a split replaceable bushing having two tapered surfaces on the exterior for securing said ring-shaped means to the side surface of said rotor, said surfaces being directed to each other by their larger bases and interacting, respectively, with a corresponding tapered surface on said ring-shaped means and an inner tapered surface on said ring-shaped means, said ring-shaped means having a circular groove, and clamping screws for moving said ring-shaped means in that circular groove.

* * * * *